United States Patent [19]
Hickey

[11] Patent Number: 5,924,640
[45] Date of Patent: Jul. 20, 1999

[54] VEHICLE OCCUPANT RESTRAINT SYSTEM

[75] Inventor: Dennis J. Hickey, Longton, United Kingdom

[73] Assignee: Royal Ordnance Public Limited Company, Lancashire, United Kingdom

[21] Appl. No.: 08/912,931

[22] Filed: Aug. 15, 1997

[30] Foreign Application Priority Data

Feb. 16, 1995 [GB] United Kingdom ............... 9503070
Feb. 15, 1996 [WO] WIPO ................. PCT/GB96/00327

[51] Int. Cl.$^6$ .................................................. B60R 22/46
[52] U.S. Cl. ........................................................ 242/374
[58] Field of Search ..................... 242/374; 280/801.1, 280/805, 806

[56] References Cited

U.S. PATENT DOCUMENTS

| | | | |
|---|---|---|---|
| 4,178,016 | 12/1979 | Andres et al. | 280/734 |
| 4,442,674 | 4/1984 | Fohl | 242/374 |
| 4,444,010 | 4/1984 | Bendler | 280/806 |
| 4,508,288 | 4/1985 | Nilsson. | |
| 4,789,185 | 12/1988 | Fohl | 280/806 |
| 5,145,209 | 9/1992 | Lenzen | 280/806 |
| 5,690,295 | 11/1997 | Steinberg et al. | 242/374 |
| 5,697,571 | 12/1997 | Dybro et al. | 242/374 |

FOREIGN PATENT DOCUMENTS

| | | |
|---|---|---|
| 0 480 137 A1 | 4/1992 | European Pat. Off. . |
| A 0 680 856 | 11/1995 | European Pat. Off. . |
| A 32 20 498 | 12/1983 | Germany . |
| 2 258 603 | 2/1993 | United Kingdom . |

OTHER PUBLICATIONS

Automotive Engineering, vol. 89, No. 7, Jul. 1981, Dallas, Texax, USA, pp. 79–80, XP002002792 David Scott: OE Airbag Combined With Seat Belt Tensioner.

*Primary Examiner*—John P. Darling
*Attorney, Agent, or Firm*—Nixon & Vanderhye P.C.

[57] ABSTRACT

A pretensioner for a vehicle seat belt retractor of the type having a rotatable take-up reel on which seat belt webbing can be wound, which comprises: (i) an elongate pressure chamber; (ii) a plurality of projectiles located in the pressure chamber, (iii) gas generator for generating a high-pressure gas within the pressure chamber so as to propel the projectile along the pressure chamber; (iv) a drive surface upon which the projectiles impinge when propelled along the pressure chamber by the high-pressure gas, the drive surface being connected to, or comprising a part of, the rotatable take-up reel of the vehicle seat belt retractor and arranged to be driven by the impinging projectiles so as to rotate the rotatable take-up reel in a belt retraction direction when impinged upon by the projectiles, so as, in operation, to take up slack in the seat belt webbing, and to pull the seat belt webbing against the vehicle occupant.

38 Claims, 5 Drawing Sheets

VEHICLE OCCUPANT RESTRAINT SYSTEM

BACKGROUND OF THE INVENTION

1. Field of the Invention

This invention relates to vehicle occupant restraint systems and more particularly to a seat belt pretensioner for taking up slack in a seat belt in the event of a vehicle collision.

2. Discussion of Prior Art

A typical inertia reel seat belt comprises a reel of webbing fitted at one end with a locking device that only functions if the reel spins too quickly. During a collision, standard inertia reel seat belts will typically allow 120 to 200 mm of slack before the locking mechanism functions. Devices which are more sensitive than this are impractical when the user unreels the belt to lock it into position in normal use. The delay in operation can allow the occupant to move out of the seat before being arrested and whilst this may avoid a fatality, it can lead to serious whiplash injuries.

Seat belt pretensioners are now widely used in vehicles to provide additional protection to the occupants in the event of a collision. They are normally connected to collision-sensing devices and use stored energy to wind in sufficient slack in the belt to lock the belt before the user can begin to move. The energy can be stored in the form of a spring or in a pyrotechnic gas-generating composition.

In a typical application, the function of the seat belt pretensioner is to rotate the seat belt retractor or take-up reel rapidly in a belt retraction direction to pull the belt against the vehicle occupant and eliminate slack in the belt. Many such pretensioner devices have been proposed, and exemplary of such prior art constructions are those disclosed in U.S. Pat. Nos. 4,178,016, 4,789,185 and 5,145,209; European patent number 0480137; German patent application number DE3715845 and UK patent application number 2258603. The entire disclosures of these prior art patents are incorporated herein by reference.

The technical requirements for a seat belt pretensioner are very numerous. Firstly it must not interfere with the normal operation of the inertia reel seat belt retractor. Secondly it must be capable of activation within a few milliseconds in order to provide adequate protection to the vehicle occupant in the event of a collision. Thirdly, vehicle manufactures' specifications now require that the pretensioner should exert a force of 700 to 800 Newtons and retract the seat belt by a minimum of 100 mm and a maximum of 200 mm. Fourthly, after activation of the seat belt pretensioner, it should preferably not interfere with the normal operation of the inertia reel seat belt retractor, in the event that the vehicle can still be driven after the collision incident.

Further very important practical requirements are that the seat belt pretensioner should be highly compact, fit on to existing inertia reel seat belt systems and preferably fit the housing profile of existing equipment.

Seat belt pretensioners which have been proposed hitherto either do not meet the technical requirements outlined above, or are unacceptably bulky or impractical.

SUMMARY OF THE INVENTION

According to the present invention there is provided a pretensioner, for example, for an inertia reel seat belt, wherein the motive force is provided by a projectile impinging upon a drive surface.

In one aspect of the invention, there is provided a pretensioner for a vehicle seat belt retractor of the type having a rotatable take-up reel on which seat belt webbing can be wound, which comprises:

(i) An elongate pressure chamber;
(ii) a plurality of projectiles located in the pressure chamber;
(iii) gas generating means for generating a high-pressure within the pressure chamber so as to propel the projectiles along the pressure chamber; and
(iv) a drive surface upon which the projectiles impinge when propelled along the pressure chamber by the high-pressure gas, the drive surface being connected to, or comprising a part of, a rotatable take-up reel of a vehicle seat belt retractor and arranged to be driven by the impinging projectiles so as to rotate the rotatable take-up reel in a belt retraction direction when impinged upon by the projectiles, so as, in operation, to take up slack in the seat belt webbing, and to pull the seat belt webbing against the vehicle occupant.

In a preferred pretensioner according to the present invention, the drive surface comprise a surface, preferably a circumferential surface, of a wheel which is connected to, or comprises part of, the rotatable take-up reel of the vehicle seat belt retractor. The drive surface may be indented, toothed, grooved, or otherwise shaped, to accept partial intrusion by the projectiles to provide a drive mechanism. The drive surface may be formed with recesses each of which is adapted to receive a single projectile.

Alternatively the drive wheel may comprise compliant material deformable by pressure contact between the drive surface and projectile. In one embodiment the drive wheel may comprise at least a circumferential surface layer of compliant material. In another embodiment the drive wheel may comprise a circumferential surface layer of rigid material, and radially inward thereof an annular layer of compliant material.

Suitable compliant materials include resilient material such as rubber, or plastics materials. In another alternative embodiment the drive wheel comprises a circumferential channel having resiliently deformable channel sides, the spacing of the channel sides being such that a projectile can be received therebetween only by deforming the channel sides. The channel sides may, for example, be spring biased towards each other.

Preferably the projectiles impinge tangentially, or at a low angle of preferably not more than 10° against the drive surface in order to provide a maximum acceleration to the surface.

The pressure chamber preferably comprises an elongate, curved tube of circular cross-section, preferably of steel or other metal capable of withstanding the pressures involved, having an open end arranged in a tangential direction, or at a low angle, to the drive surface. The open end of the tube preferably terminates in an open channel which directs the projectiles against the drive surface. The open channel is preferably provided with a terminal arrest member, positioned so as to slow down the projectiles after they have left the drive surface.

The number of projectiles can be chosen in order to give the required retraction of the seat belt. Preferably there are at least 30, and preferably not more than 50 projectiles, and these are preferably sufficient to rotate the central shaft of the take-up reel by from one and a half to three times, for example, twice, during the activation of the pretensioner. This will result in a compact device capable of optimum retraction effect.

In a preferred embodiment, for example, using a drive wheel and spherical projectiles (balls) which remain in contact one with the next during use, the number of projectiles will depend on inter alia (i) the diameter of the drive wheel or pulley, (ii) the number of required revolutions of the drive wheel, and (iii) the diameter of the projectiles (balls). If the diameter of the drive wheel is "D" the diameter of the projectiles is "d" and the number of revolutions is "N", then the number of balls is given by rounding up the result of applying the formula:

$$\frac{N\pi(D+d)}{d}$$

In an example, N=2, D=50 mm and d=10 mm, giving a calculated result of 37.7, ie. 38 balls.

Preferably the projectiles are not connected to each other, and most desirably they are spherical form. This leads to a number of advantages. For example separate unconnected projectiles can be retained in a compact receptacle after actuation of the pretensioner; if they are linked together, a larger or longer receptacle would be required. Projectiles in the form of a row of discrete balls can also articulate more freely than, for example, a chain. The designer is thus provided with greater freedom to shape and position the elongate pressure chamber so as to render the overall design compact, eg by locating parts of the pressure chamber in positions which would otherwise be inconvenient and therefore not usable for this or any other purpose.

The projectiles are preferably spherical in shape. For example, the projectiles may comprise a series of metal balls, for example, ball bearings, which are arranged in a row in a tubular metal pressure chamber. The diameter of the metal balls is such as to occupy substantially the entire internal diameter of the tube, whilst allowing the balls to travel freely therein.

Advantageously, the pretensioner comprises an arcuate portion of the elongate tube which curves partly or wholly around the drive surface.

Advantageously the axis of the elongate tube is disposed in more than one plane. This can lead to a pretensioner of compact design, for example at least part of the elongate tube may be of helical form, and/or at least part of the elongate tube may be disposed within the take-up reel. Additionally, the gas generating means may be at least partly disposed within the take-up reel.

The end of the tube remote from the open end is preferably closed or capped, and a suitable gas-generating composition can be disposed therein. Such a gas-generating composition can comprise, for example, sodium azide, or a gas-generating composition comprising nitroguanidine, as described and claimed in our co-pending UK Patent Application No.9503066 entitled "Gas Generating Composition" filed on the same day as this Application. Alternatively, the gas-generating composition can be provided in a separate chamber connected to the pressure chamber. The gas-generating composition preferably comprises a pyrotechnical composition ignited by an electronic ignition system activated by a deceleration sensor.

After impinging on the drive surface, the projectiles are preferably collected in a collection chamber, or an open cavity, which can conveniently be the housing of the seat belt retractor. The collection chamber or cavity is preferably provided with a clear panel through which the projectiles can be viewed, to provide a functional check on the device.

Preferably retaining means are provided for retaining the projectiles in the pressure chamber. Such retaining means may comprise, for example, a rigid foam which is injected into the pressure chamber after the projectiles have been inserted therein.

The period of activation of the pretensioner is preferably around 20 milliseconds, and the pretensioner is preferably designed to wind in from 120 to 200 mm of seat belt (depending on the amount left on the take-up reel) and cause the belt to lock.

Preferably when the projectiles are positioned in the collection chamber they provide no impediment or obstacle to the normal operation of the seat belt, so that after a collision and subsequent actuation of the pretensioner the vehicle occupant does not continue to be held firmly against the seat. The occupant can thus more readily get out of the vehicle, or continue to drive if possible.

BRIEF DESCRIPTION OF THE DRAWINGS

Embodiments of the invention will now be described with reference to and as illustrated in the accompanying drawings in which.

DETAILED DISCUSSION OF PREFERRED EMBODIMENTS

Figure 1:
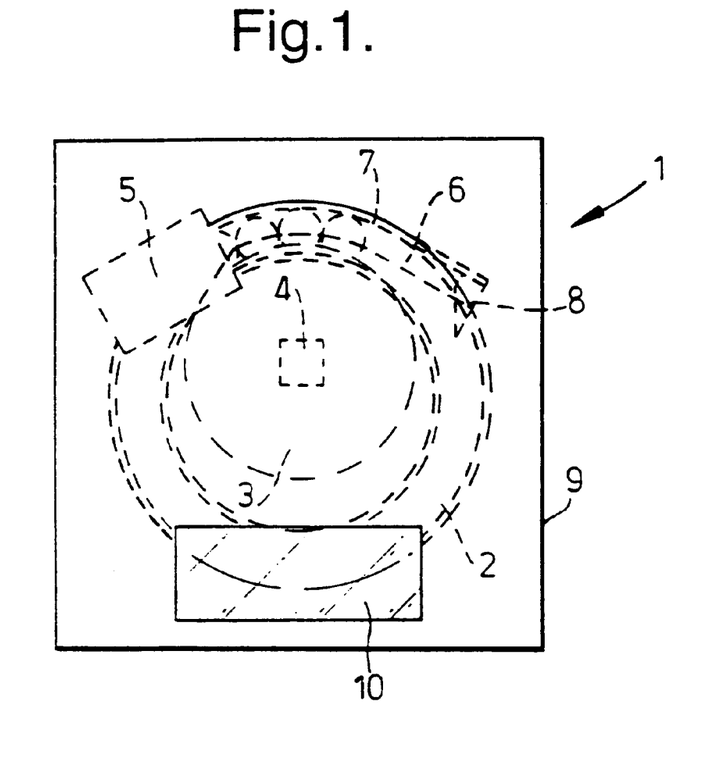
FIG. 1 shows a seat belt pretensioner drive mechanism according to the invention in side elevation.
Figure 2:
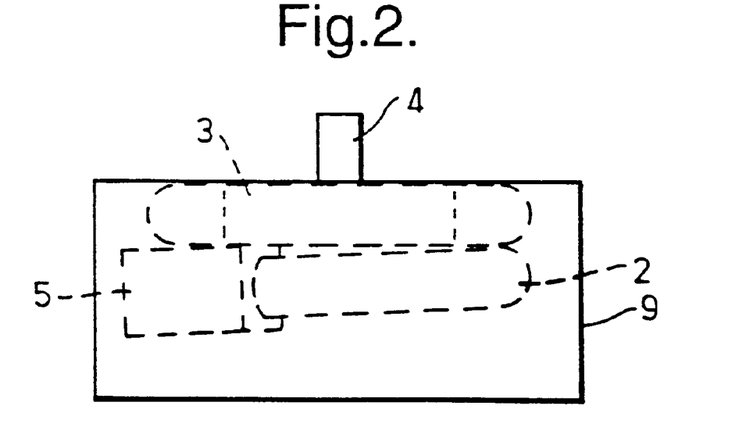
FIG. 2 shows the pretensioner of FIG. 1 in top elevation.

Referring firstly to FIG. 1, the pretensioner illustrated generally at 1 comprises a curved pressure tube 2 which is coiled helically around a drive wheel 3 attached to a shaft 4. The pressure tube 2 is mounted eccentrically of the axis of the drive wheel 3 and has a diameter of curvature slightly greater than the wheel. The tube 2 has a closed end, at which there is situated a cap enclosing a gas-generating mechanism 5, and an open end which is cut back, as illustrated by the broken line 6, to form an open-sided channel 7. At the end of the channel 7 there is provided a projecting arrest member 8. As can be seen from FIG. 2, the curved pressure tube 2 described approximately 1½ turns about the drive wheel 3. The pretensioner is enclosed in a collection chamber 9, which may comprise the whole or part of the seat belt retractor housing, the chamber 9 having a clear panel 10 for viewing the interior thereof.

Figure 3:
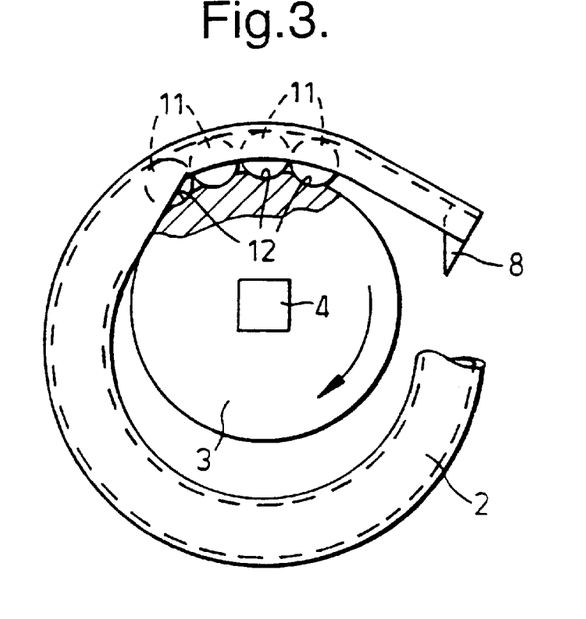
FIG. 3 shows the pretensioner of FIGS. 1 and 2 in side elevation in an enlarged scale with parts broken away to illustrate the mode of operation.
Figure 4:
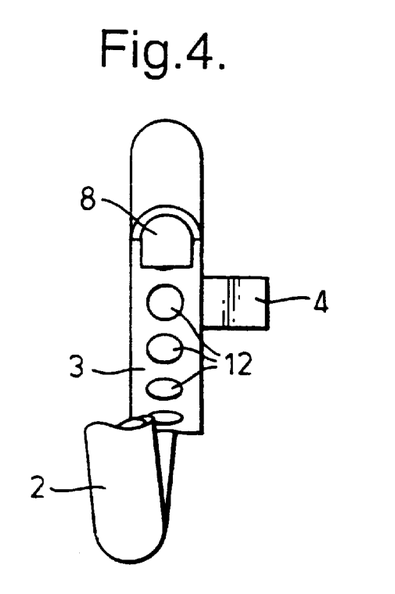
FIG. 4 shows the pretensioner of FIGS. 1 to 3 in end elevation again with parts broken away to show the mode of operation.

Referring now to FIG. 3, which depicts the pretensioner in operation, a row of metal balls 11 are illustrated passing along the channel 7 of the pressure tube 2. There may be, for example, from 30 to 50 of such balls 11 in the pressure tube 2. The balls 11 have a diameter slightly less than the internal diameter of the tube 2 and are freely moveable therein. The drive wheel 3 is provided with a series of circumferential indentations 12 about its periphery, which are spaced apart by a distance such that when adjacent balls 11 are located in the indentations the surfaces of adjacent balls are just touching. The arrangement is shown again in FIG. 4 which also shows the drive shaft 4 which is attached to the take-up reel of a seat belt retractor (not shown).

Figure 5:
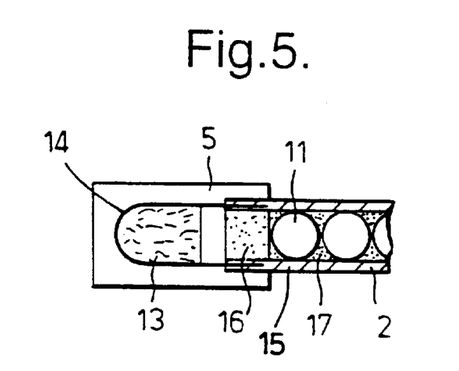
FIG. 5 shows a scrap view in section of the gas-generating mechanism.

FIG. 5 shows a detail of the gas-generating mechanism 5. A pyrotechnic gas-generating composition 13 is packed into a pressure-resistant plug 14 firmly mounted at the end 15 of the pressure tube 2. The pyrotechnic composition 13 is ignited by an electronic igniter (not shown) which is activated by a deceleration sensor (not shown). A felt plug 16 is positioned at the end of the pressure tube 2 and serves as a limit member for the travel of the row of balls 11.

In the rest, or inactive, position of the pretensioner, the balls 11 are confined within the pressure tube 2 by a rigid foam 17 which is injected into the pressure tube 2 after the balls have been inserted and which solidifies to retain the balls 11 in the pressure tube. The plug 16 prevents the foam from reacting the pyrotechnic composition. With the balls 11 retained in the tube 2, the drive wheel 3 and shaft 4 are able to rotate freely with the take-up reel of the seat belt retractor. The ball retaining means may alternatively comprise, for example, a frangible plug, or a spring means, which is compressed as the balls are ejected from the pressure tube.

In the event of a collision, the deceleration sensor activates the electronic igniter which in turn sets off the pyrotechnic gas-generating composition 13. The volume of gas generated by the composition 13 is sufficient to displace the felt plug 16, and propel the row of balls 11 at considerable speed along the pressure tube 2. The foam 17, of course, disintegrates as the balls are ejected from the pressure tube 2. When the balls reach the open channel 7 they come into contact with the indentations 12 on the drive wheel 3 and cause the drive wheel 3 and drive shaft 4 to rotate at high speed. The drive shaft rotates the take-up reel of the seat belt retractor causing retraction of the seat belt by the desired amount.

The path of the balls is tangential to the circumference of the drive wheel 3 and as they fly off they each come into contact with the arrest member 8 at the end of the open channel 7 and suffer a substantial deceleration. This prevents the balls from damaging the wall of the collection chamber 9. The pretensioner is preferably enclosed within the housing of the seat belt retractor, which comprises the collection chamber 9, and as the balls are ejected from the open channel 7, they collect in the bottom of the housing from where they can be viewed through the clear panel 10 to provide a visual check on whether the pretensioner has been activated. After use, they can be recovered and reused with a fresh charge of pyrotechnic composition as appropriate.

After the last ball has left the periphery of the drive wheel 3 there is no further force acting on the drive wheel which is then locked in position by the seat belt retractor lock. When the vehicle has come to a halt, the seat belt retractor lock is released and the seat belt can again be used normally. The projectiles 11 are by this stage clear of the drive surface and thus do not interfere in any way with such normal use.

Figure 6:
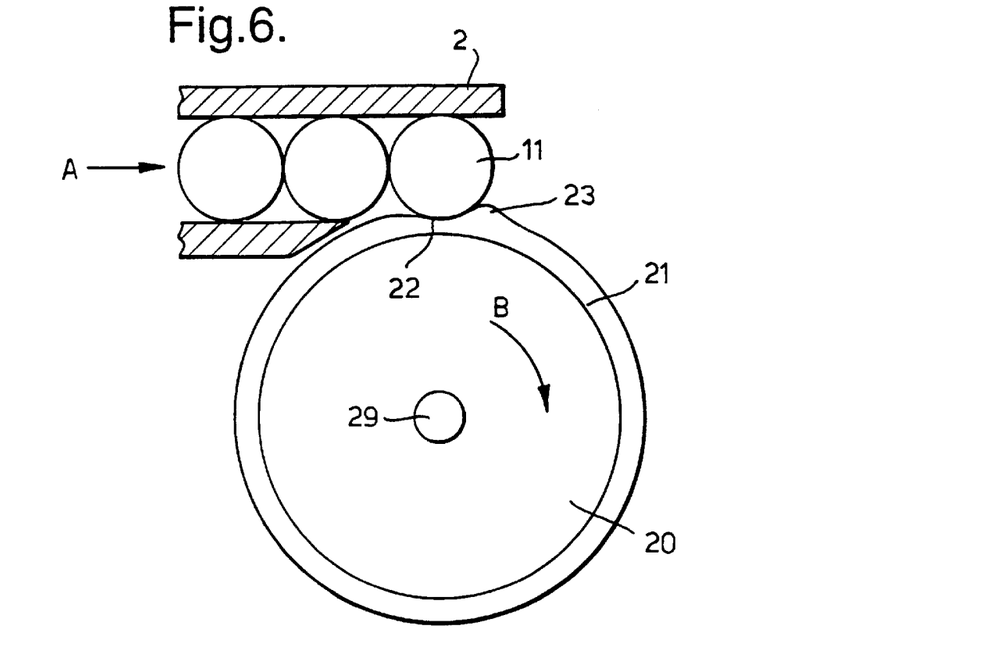
FIG. 6 illustrates an alternative form of drive wheel arrangement for a pretensioner according to the invention.

FIG. 6 illustrates an alternative form of drive which comprising a drive wheel 20 which has a circumferential surface layer 21 of a compliant material. In use, balls 11 are propelled in the direction of the arrow A along a pressure tube 2 by means of pressure generated by a gas-generating mechanism 5, as described with reference to FIGS. 1 to 5.

When the balls encounter the surface layer 21, they are constrained between the wall of the tube 2 and the layer 21, so as to exert a radially inward pressure thereon as well as a forward pressure tending to rotate the wheel 20 in the direction of the arrow B.

The compliant material of the surface layer 21 thus deforms as illustrated so as to create an indentation 22 which receives a ball 11, and a lip 23 which resists free passage of the ball past the wheel. Each successive ball 11 thus drives the wheel 20 to rotate in the direction of the arrow B until rotation of the wheel enables the ball to escape, past the lip 23, and a subsequent ball 11 then repeats the cycle. The wheel 20 drives the take-up reel (not shown) via a shaft 29 on which the wheel is mounted.

The compliant layer in this embodiment should be soft enough to deform under the action of the balls 11 as illustrated, but needs relatively high shear strength so that the lip 23 does not shear off under the load imposed by the balls 11. Suitable materials for the compliant layer are resilient materials such as polypropylene, polyethylene (especially UHMPE—ultra high modulus polyethylene), and reinforce rubber (eg fabric-reinforced).

Figure 7:
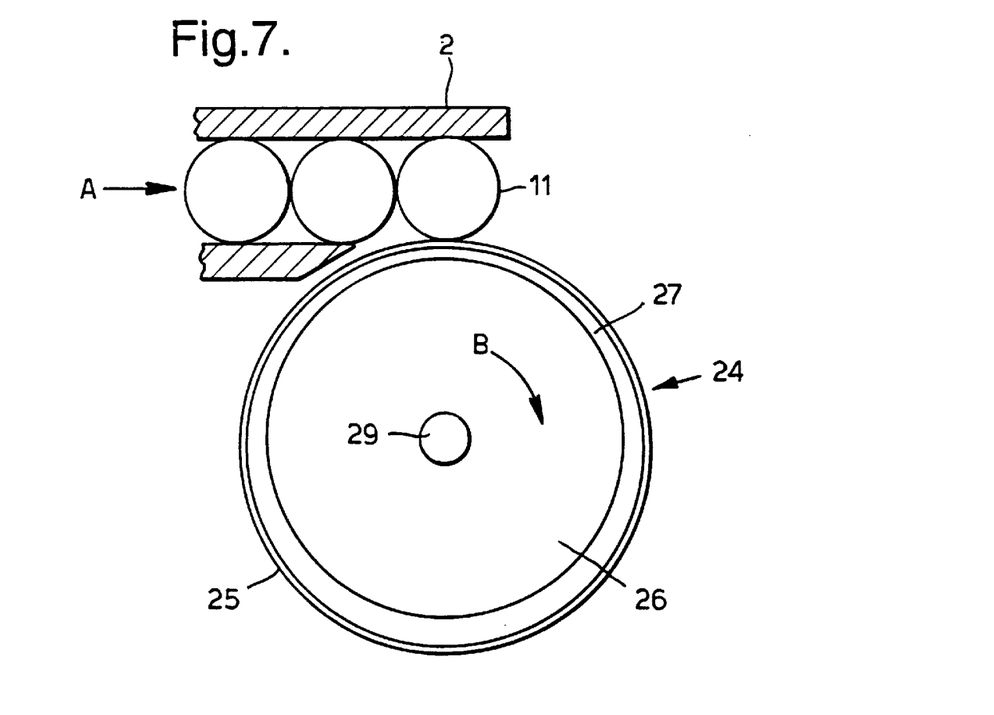
FIG. 7 illustrates another form of drive wheel arrangement for a pretensioner according to the invention.

As illustrated in FIG. 7, a drive wheel 24 for use in the invention comprises a circumferential surface layer 25 of rigid material such as steel or hard plastics material, and an inner hub zone 26 of a similar material. Sandwiched between the hub 26 and the circumferential layer 25 is an annular layer 27 of compliant material, which may be a material similar to that of the layer 21. In use, when the pretensioner is actuated, the balls 11 are driven in the direction of the arrow A into the space between the wall of the pressure tube 2 and the layer 25. This space is designed to be somewhat narrower then the diameter of the balls 11, so that the material 27 must deform in order to admit the balls into this space. A pressure load is thus created between the balls 11 and the layer 25 whereby successive balls drive the wheel 24 to rotate in the direction of the arrow B, until each successive ball escapes from the pinch between the rim 25 and the tube 2.

Figure 8:
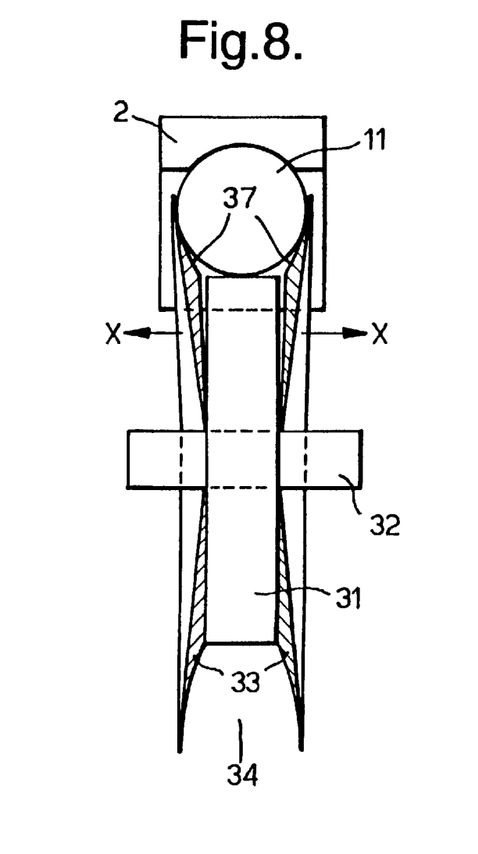
FIG. 8 illustrates in end elevation a further form of drive wheel arrangement for a pretensioner according to the invention.
Figure 9:
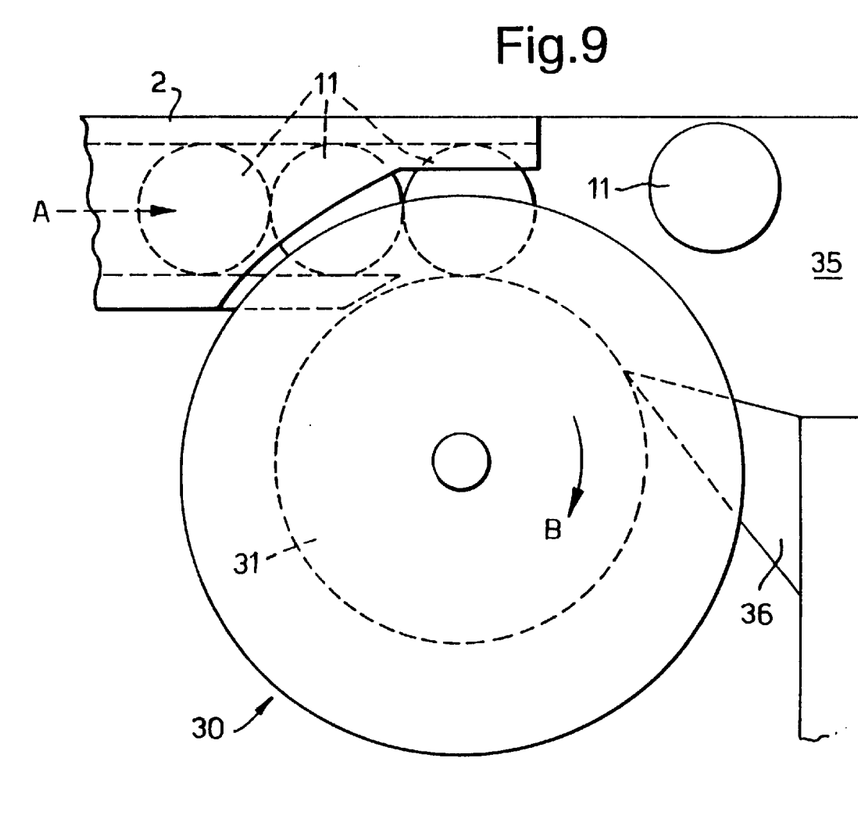
FIG. 9 illustrates in side elevation the drive wheel arrangement of FIG. 8.

As illustrated in FIGS. 8 and 9, a drive wheel 30 comprises a rigid hub 31, mounted on a drive shaft 32 which drive the take-up reel (not shown) to rotate. Mounted adjacent the hub 31 are a pair of discs 33 of resilient material such as spring steel. The discs are fixed to the hub only near the shaft 32, and they define between their radially outer portions 33 and the circumference of the hub 31, a circumferential channel 34. The portion 33 constitute channel sides, and a ball 11 can be received into the channel only by deforming the channel sides to move apart in the direction of the arrows x, as shown in FIG. 8. When the pretensioner is actuated, the balls 11 are propelled along the tube 2 in the direction A as previously described. The tube 2 opens adjacent to the wheel 30, and is so spaced therefrom that the tube wall forces the balls to enter the channel 34 to its full depth, so that the channel sides 33 are sprung apart. By virtue of the friction thus created between the channel sides 33 and the balls 11, the balls thus drive the wheel 30 to rotate in the direction of the arrow B. The balls escape from the pinch between the tube 2 and the channel 34 into a collection area 35, partly shown in FIG. 9. Their removal from the channel 34 is ensured by means of a stripper plate 36. Friction material can be applied to the surfaces of the channel sides 33, as illustrated at 37.

The embodiments illustrated in FIGS. 6 to 9 all have a homogeneous circumference, ie without individual teeth or recesses for receiving individual balls separately. This has the considerable advantage that the balls 11 can engage readily with the drive surface of the drive wheel in each case, without the risk that a ball, especially the first ball, may encounter the drive surface at a location between two individual teeth or recesses which could cause jamming or damage to the mechanism.

In addition, a further considerable advantage is that the tension load which the device can apply to a seat belt is limited by the maximum torque which can be applied between the balls and the drive wheel. If this maximum is exceeded, the balls imply escape from the pinch between the drive wheel and the pressure tube in each of these embodiments. This provides a further safety feature in that the user is protected against the possibility of excessive tightening of the belt and the output torque of the wheel is independent of the maximum pressure produced by the gas generator.

Figure 10:
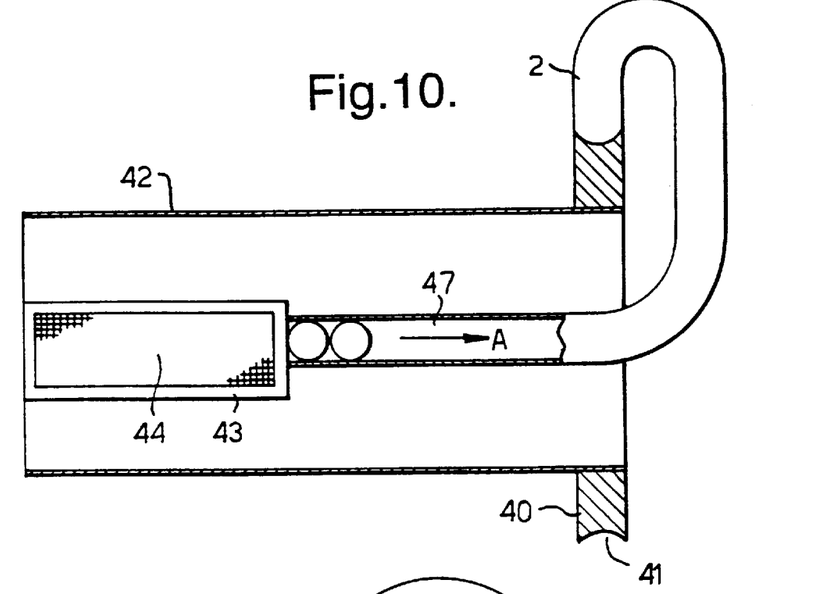
FIG. 10 is an end elevation illustrating a pretensioner in accordance with the invention in which the pressure chamber axis is disposed in more than one plane.
Figure 11:
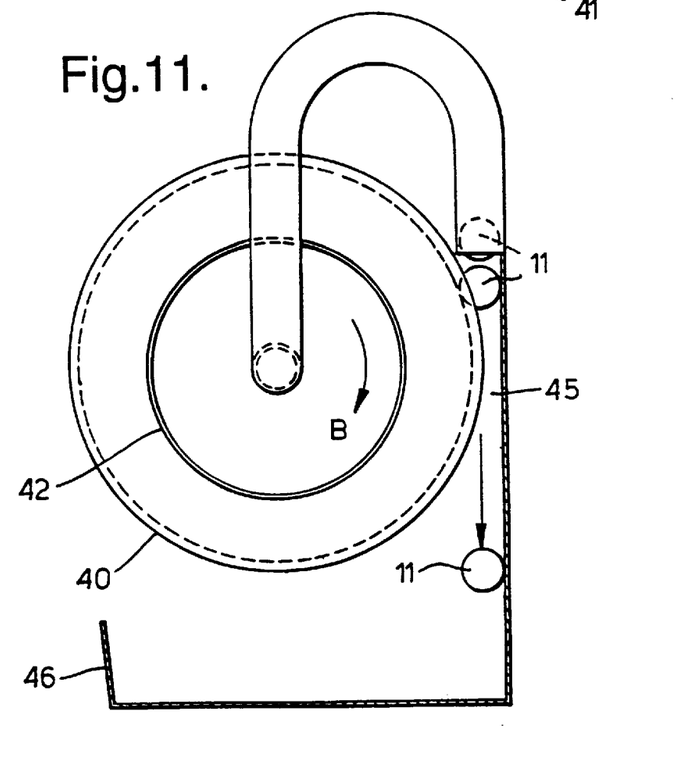
FIG. 11 is a side elevation of the pretensioner illustrated in FIG. 10.

As shown in FIGS. 10 and 11, a drive wheel 40 is formed of a compliant material (for example UHMPE) and has a continuous part-circular-section groove 41 formed in tis periphery for receiving balls 11. The wheel 40 is mounted on a take-up reel 42 of a seat belt retractor.

A gas generator 43 containing pyrotechnic material 44 is housed within the reel 42, together with the first section 44 of an elongate tube of circular cross-section 44 of an elongate tube of circular cross-section which constitutes the pressure chamber 2. The tubular pressure chamber 2 is bent so as to pass radially outward from the reel and then back on itself so as partially to embrace the circumference of the drive wheel. Balls 11 (only two are shown for clarity) are drive, upon actuation of the gas generator 43, in the direction of the arrow A, so as to pass into the pinch between the rim 41 and the open end 45 of the tube 2, so as to drive the wheel 40 and the reel 42, to rotate in the direction of the arrow B, in similar manner to the embodiment of FIG. 6. The used balls 11 are collected in a receptacle 46.

The combination of spherical projectiles 11 in a circular-section tube, the projectiles not being connected to each other, permits that the pressure tube is strong in resisting the pressure of the gas generator, and can be bent into three-dimensional shapes while the individual balls have no restriction on their relative articulation which limits the shape which can be adopted for the tube 2. Thus the gas generator 43 can be located inside the reel 42, together with part of the pressure tube 2. This space would otherwise not be used, and the overall bulk of the pretensioner is thus substantially less than would otherwise be the case.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed in one example only of a generic series of equivalent or similar features.

The invention is not restricted to the details of the foregoing embodiments. This invention extends to any novel one, or any novel combination, of the features disclosed in this specification (including any accompanying claims, abstract and drawings), or to any novel one, or any novel combination, of the steps of any method or process so disclosed.

What is claimed is:

1. A pretensioner for a vehicle seat belt retractor of the type having a rotatable take-up reel on which seat belt webbing can be wound, which comprises:
   (i) an elongate pressure chamber;
   (ii) a plurality of projectiles located in the pressure chamber;
   (iii) gas generating means for generating a high-pressure gas within the pressure chamber so as to propel the projectiles along the pressure chamber;
   (iv) a drive surface upon which the projectiles impinge when propelled along the pressure chamber by the high-pressure gas, the drive surface being connected to, or comprising a part of, a rotatable take-up reel of a vehicle seat belt retractor and arranged to be driven by the impinging projectiles so as to rotate the rotatable take-up reel in a belt retraction direction when impinged upon by the projectiles, so as, in operation, to take up slack in the seat belt webbing, and to pull the seat belt webbing against the vehicle occupant
   wherein said drive surface comprises a drive wheel including at least one surface of rotation along which said projectiles are directed during gas generation, said drive surface comprising a partially resilient surface, said surface deforming in a radial direction with respect to an axis of rotation of said drive wheel to accommodate said projectile disposed against said surface.

2. A pretensioner according to claim 1, in which the drive surface comprises a circumferential surface of a drive wheel which is connected to, or comprises part of, a rotatable take-up reel of a vehicle seat belt retractor.

3. A pretensioner according to claim 1, in which the drive surface is indented, toothed, grooved, or otherwise shaped, to accept partial intrusion by the projectiles.

4. A pretensioner according to claim 3 in which the drive surface is formed with recesses each of which is adapted to receive a single projectile.

5. A pretensioner according to claim 1 in which the drive wheel comprises compliant material deformable by pressure contact between the drive surface and a projectile.

6. A pretensioner according to claim 5 in which the drive wheel comprises at least a circumferential surface layer of compliant material.

7. A pretensioner according to claim 5 in which the drive wheel comprises a circumferential surface layer of rigid material, and radially inward thereof an annular layer of compliant material.

8. A pretensioner according to claim 5 in which the drive wheel comprises a circumferential channel having resiliently deformable channel sides, the spacing of the channel sides being such that a projectile can be received therebetween only by deforming the channel sides.

9. A pretensioner according to claim 8 in which the channel sides are spring biased towards each other.

10. A pretensioner according to claim 1, in which, in operation, the projectiles impinge tangentially against the drive surface.

11. A pretensioner according to claim 1, in which the pressure chamber comprises an elongate tube of circular cross-section.

12. A pretensioner according to claim 11, in which the tube has an open end arranged in a tangential direction to the drive surface.

13. A pretensioner according to claim 11, in which the tube terminates in an open channel, which, in operation, directs the projectiles against the drive surface.

14. A pretensioner according to claim 13 in which the open channel is provided with a terminal arrest member, positioned so as, in operation, to slow down the projectiles after they have left the drive surface.

15. A pretensioner according to claim 1 in which the number of projectiles is sufficient to rotate the take-up reel of the seat belt retractor by between one and a half and three times during the activation of the pretensioner.

16. A pretensioner according to claim 1 which comprises at least 30 projectiles.

17. A pretensioner according to claim 16 which comprises not more than 50 projectiles.

18. A pretensioner according to claim 1 wherein the projectiles are not connected to one another.

19. A pretensioner according to claim 1 wherein the projectiles are spherical in form.

20. A pretensioner according to claim 19 in which the spherical projectiles are arranged in a row in an elongate pressure tubes and the diameter of the projectiles is such as to occupy substantially the entire internal diameter of the tube whilst allowing the projectiles to travel freely therein.

21. A pretensioner according to claim 20 which the elongate pressure tube comprises an arcuate portion which curves partly or wholly around the drive surface.

22. A pretensioner according to claim 20 in which the axis of the elongate tube is disposed in more than one plane.

23. A pretensioner according to claim 22 wherein at least part of the elongate tube is of helical form.

24. A pretensioner according to claim 22 in which part of the elongate tube is disposed within the take-up reel.

25. A pretensioner according to claim 22 in which the gas generating means are at least partially disposed within the take-up reel.

26. A pretensioner according to claim 1, in which a gas-generating composition is disposed within the pressure chamber.

27. A pretensioner according to claim 1, in which the gas-generating composition comprises a pyrotechnic composition.

28. A pretensioner according to claim 1, that is provided with a collection chamber, which, in operation, is adapted to receive the projectiles after they have impinged on the drive surface.

29. A pretensioner according to claim 28, in which the collection chamber is provided with an at least partly transparent panel through which the projectiles can be viewed.

30. A pretensioner according to claim 1 in which the projectile, after operation of the pretensioner, are positioned such that they provide no impediment or obstacle to the normal operation of the seat belt.

31. A vehicle seat belt retractor provided with a pretensioner according to claim 1.

32. A seat belt retractor according to claim 31, in which, in operation, the action of the seat belt pretensioner rotates the take-up reel of the seat belt retractor by from 1 to 3 times within a period of 20 milliseconds.

33. A seat belt retractor according to claim 31, in which, in operation, the pretensioner is adapted to wind in form 120 to 200 mm of seat belt.

34. A pretensioner for a vehicle seat belt retractor of the type having a rotatable take-up reel on which seat belt webbing can be wound, which comprises:

(i) an elongate pressure chamber;

(ii) a plurality of projectiles located in the pressure chamber;

(iii) gas generating means for generating a high-pressure gas within the pressure chamber so as to propel the projectiles along the pressure chamber;

(iv) a drive surface upon which the projectiles impinge when propelled along the pressure chamber by the high-pressure gas, the drive surface being connected to, or comprising a part of, a rotatable take-up reel of a vehicle seat belt retractor and arranged to be driven by the impinging projectiles so as to rotate the rotatable take-up reel in a belt retraction direction when impinged upon by the projectiles, so as, in operation, to take up slack in the seat belt webbing, and to pull the seat belt webbing against the vehicle occupant in which a rigid foam retains the projectiles within the pressure chamber prior to activation of the pretensioner.

35. A pretensioner according to claim 34 wherein the rigid foam is injected into the pressure chamber after the projectiles have been inserted therein and which solidifies to retain the projectiles in the pressure chamber.

36. A pretensioner according to claim 34 in which the drive surface comprises a drive wheel including at least a circumferential surface layer of compliant material.

37. A pretensioner according to claim 34 in which the drive surface comprises a drive wheel including a circumferential surface layer of rigid material, and radially inward thereof an annular layer of compliant material.

38. A pretensioner according to claim 34 in which the drive surface comprises a drive wheel including a circumferential channel having resiliently deformable channel sides, the spacing of the channel sides being such that a projectile can be received therebetween only be deforming the channel sides.

* * * * *